J. W. GAMBLE.
SEPARATOR.
APPLICATION FILED MAY 10, 1910.
1,080,511.	Patented Dec. 2, 1913.
2 SHEETS—SHEET 1.
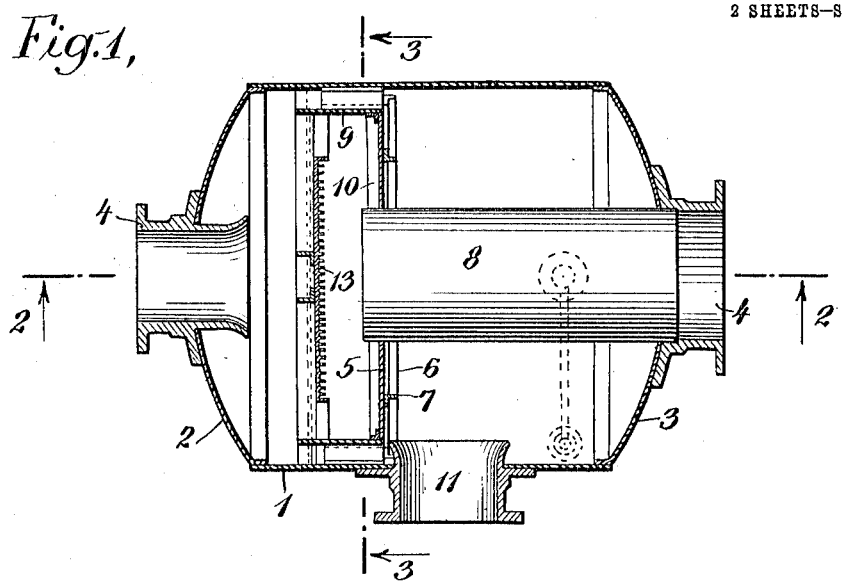
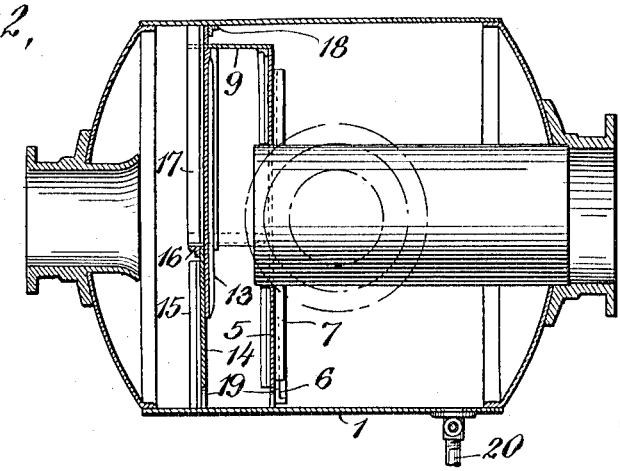
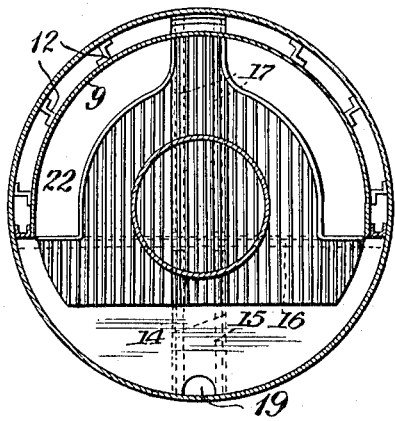
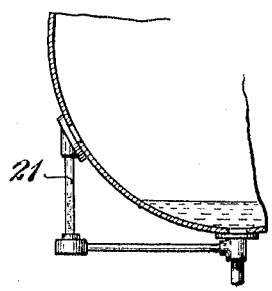
WITNESSES:
INVENTOR
Joseph W. Gamble
BY
J. C. Edmonds
ATTORNEY

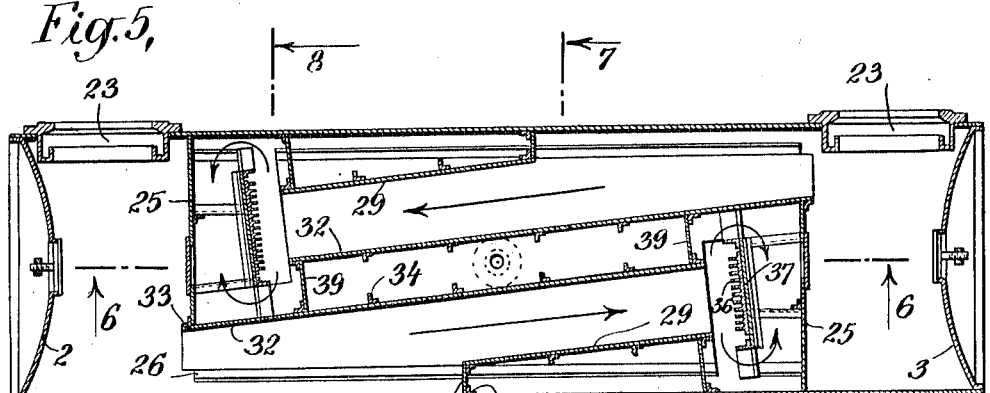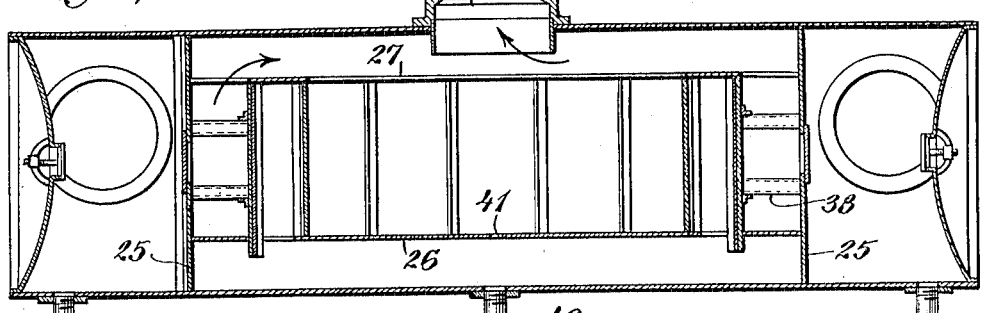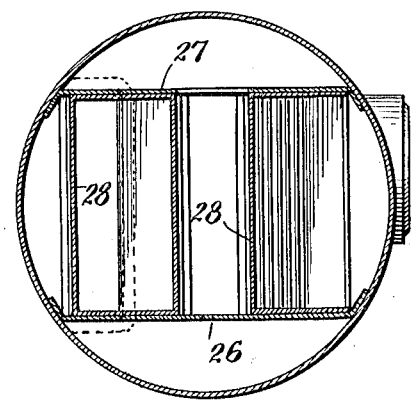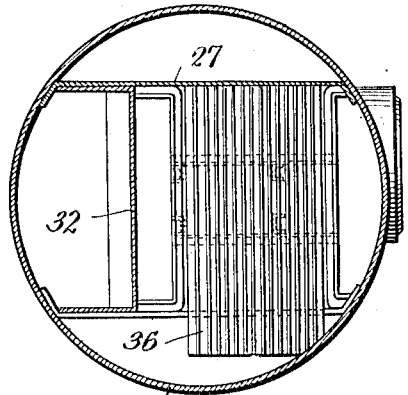

UNITED STATES PATENT OFFICE.

JOSEPH W. GAMBLE, OF PHILADELPHIA, PENNSYLVANIA, ASSIGNOR TO HARRISON SAFETY BOILER WORKS, OF PHILADELPHIA, PENNSYLVANIA, A COPARTNERSHIP OF PENNSYLVANIA.

SEPARATOR.

1,080,511.   Specification of Letters Patent.   Patented Dec. 2, 1913.

Application filed May 10, 1910. Serial No. 560,493.

*To all whom it may concern:*

Be it known that I, JOSEPH W. GAMBLE, a citizen of the United States, residing in Philadelphia, in the county of Philadelphia and State of Pennsylvania, have invented certain new and useful Improvements in Separators, of which the following is a specification.

This invention relates to separators for use in steam systems in extracting oil and other impurities from the steam.

The object of the invention is to effect certain improvements in the construction of separators for this purpose, the improvements being directed particularly to the provision of means located within the separator and forming part thereof and arranged to cause the steam to flow in a straight line substantially perpendicular to a baffle-plate immediately before encountering the baffle-plate so that the oil and other impurities carried by the steam will be thrown against the baffle-plate and will adhere thereto. Separators of this character are of particular utility in cases where the space between pieces of apparatus where a separator must be installed is very much limited or where the arrangement of the pipe in a system requires that the separator be installed within a limited space or in an unusual position. Furthermore, a separator constructed in accordance with the invention is preferably provided with an outlet opening through the wall of the casing which opening is located at a point in the casing between the inlet opening and the baffle-plate so that though the inlet and outlet openings are close together the steam has a "run" of substantial length within the separator prior to encountering the baffle-plate.

I have illustrated embodiments of my invention in the accompanying drawings in which—

Figure 1 is a horizontal section of the separator, Fig. 2 is a vertical section on line 2—2 of Fig. 1, Fig. 3 is a transverse section on line 3—3 of Fig. 1, Fig. 4 is a detail view in transverse section, Fig. 5 is a horizontal section of a modified form of separator, Fig. 6 is a vertical section on line 6—6 of Fig. 5, Fig. 7 is a transverse section on line 7—7 of Fig. 5 and Fig. 8 is a transverse section on line 8—8 of Fig. 5.

Referring first to Figs. 1 to 4 inclusive, the separator consists of a casing formed of a cylindrical wall 1 and heads 2 and 3 closing the ends thereof, these heads having tubular connectors 4 fixed thereon for facilitating the connection of the inlet and outlet pipes to the separator within the casing. A supporting wall 5 is located transversely, this being secured to the wall 1 by means of a sheet-metal strip 6 of angular cross-section extending partially around wall 1 and secured to it and to the partition 5; also angular strips 7 are secured to the wall 5 and at their ends are secured to the wall 1. The wall 5 has a central circular opening therein through which extends one end of a length of pipe 8 the other end of which enters within and is supported by the tubular inlet connection 4. The upper end of the wall 5 is of less diameter than the casing of the separator and a sheet-metal strip 9 bent lengthwise thereof to substantially a semi-circle, as shown in Fig. 3, is brought down upon the upper edge of the wall 5 and is secured thereto by means of an angular sheet-metal strip 10 having one web secured to the strip 9 and the other to the wall 5. A passageway is thus formed between strip 9 and the casing of the separator leading to the space around the tubular member 8 and between that member and the casing of the separator. An outlet opening passing through the wall of the separator communicates with this space, as shown at 11. Between the strip 9 and the wall of the separator are a plurality of struts 12, these serving as spacers and securing the parts together with the requisite strength.

Opposite the end of the tubular member 8 distant from the inlet opening 4 of the separator is a baffle-plate 13, this being disposed in a plane substantially transverse to the axis of the tubular member 8. The shape of this baffle-plate is best shown in Fig. 3. It is supported by being secured to a plate 14 mounted within the separator substantially parallel to the wall 5 by means of angular sheet-metal strips 15 extending vertically and secured to plate 14 and wall 1. A similar strip 16 extends horizontally across the separator and is secured to plate 14 and wall 1. Above the strip 16 strips 17 vertically disposed are secured to the plate 13, their upper ends extending above the plate and being secured to the top of the casing of the separator by means of an angular sheet-metal strip 18.

At the bottom of the supporting plates 5 and 14 openings are cut, as indicated at 19, to permit the oil and other impurities flowing down from plate 13 and the water of condensation to pass therethrough. A drain pipe 20 is connected to an opening in the casing of the separator at the bottom of the latter for use in draining these impurities and the water of condensation from the separator. In connection with this drain pipe an indicator 21 may be provided as shown in Fig. 4 for indicating the amount of liquid within the casing of the separator as will be readily understood.

The steam enters the separator through the inlet opening 4 shown at the right and passes through the tubular member 8; on issuing from this tube the steam encounters the baffle-plate 13 and oil and other impurities strike and adhere to the corrugated surface of the baffle-plate. The steam thus purified passes to the left and to the right around the sides of the baffle-plate and through the spaces shown at 22 in Fig. 3, between the sides of the baffle-plate and the strip 9. A portion of the steam will then pass out through the outlet opening 4 shown at the left, and the remainder of the steam will reverse its direction of flow and pass through the openings between plate 9 and the exterior wall of the separator into the space about the tubular member 8 from which it will pass through the outlet 11. It will be seen that the steam has an extended run within the separator and in a direction transverse to the plane of the baffle-plate before encountering the baffle-plate so that the flow of the steam will be given a direction which will insure carrying the steam properly against the baffle-plate.

Figs. 5 to 8 show a form of separator differing in construction from that shown in Figs. 1 to 4 but having substantially the same characteristics. In these figures the separator consists of a casing formed of a cylindrical wall 1 closed at its ends by heads 2 and 3 and two inlet openings 23 enter the casing through or near the ends thereof. Near each end of the separator is a wall 25 mounted transversely within the separator. Extending between these two walls 25 are two sheet-metal plates 26 and 27, these plates being parallel one to the other; in the space between the two transverse plates 25 and the two longitudinal plates 26 and 27 are two passageways parallel one to the other but inclined slightly relatively to the length of the separator. These passageways are formed by sheet-metal strips bent to a rectangular cross-section as shown at 28 in Fig. 7 and inserted between the longitudinal plates 26 and 27. At opposite ends the two passageways are cut away on opposite sides as shown in Fig. 5. The outer wall 29 of each passageway is secured to the adjacent portion of the wall 1 of the separator by a suitable metallic piece 30, connected to the wall 29 and to the wall of the separator by sheet-metal strips 31 of angular cross-section. The inner walls 32 are similarly secured to the transverse walls 25 by strips 33 and are strengthened by strips 34. The separator is provided with two baffle-plates 36 one mounted opposite the end of each of the two passageways and substantially transverse to the length of that passageway. Each baffle-plate is secured to a wall 37 mounted upon the plates 26 and 27 and secured to the wall 25 by means of strips 38. The lower end of the baffle-plate extends through an opening in the lower horizontal plate 26 so that oil and other impurities may drip down through this opening into the bottom of the separator. The adjacent walls 32 of the passageways formed by the strips 28 are connected by short sheet-metal pieces 39 and the upper plate 27 may be cut away between the walls 32 and 39. Between wall 39 and the support 37 for the baffle-plate plate 27 is not cut away, as is shown in Fig. 6. Between the walls 37 and 25, the plate 27 is cut away so as to provide a passage from the rear of the baffle-plate to the top of the separator.

The separator is provided with an outlet shown at 40 leading from the top of the casing above the plate 27. Directly below this the plate 26 is preferably provided with an opening 41 to permit the water of condensation to pass therethrough and to the bottom of the casing are connected three drain pipes 42, one at the center of the separator and one near each end.

Steam enters the separator at the two inlet openings 23 and from each of these openings it passes through one of the two parallel passageways within the separator. On issuing from the passageway the steam encounters a baffle-plate arranged substantially transverse to the axis of the passageway and the purified steam flows around the baffle-plate and upwardly above plate 27 and out through the outlet opening 40. The passages formed by the strips 28 located within the separator serve to give direction to the flow of the steam and cause the steam to properly engage the corresponding baffle-plate, so that the purification of the steam will be thorough.

Having described my invention, what I claim as new therein and desire to secure by Letters Patent of the United States is:

1. A separator comprising a casing having an inlet opening, a baffle-plate located therein distant from said opening, a tubular member of substantial length mounted within the casing and extending in a direction substantially transverse to the plane of the baffle-plate from the inlet opening into proximity to the baffle-plate, said casing having an outlet opening in the wall thereof between the inlet opening and the baffle-plate, and means providing a passageway for steam from said tubular member around the baffle-plate to the side thereof distant from the inlet opening and back to the said outlet opening, substantially as set forth.

2. A separator comprising a casing having an inlet opening, a baffle-plate located therein distant from said opening, a tubular member of substantial length mounted within the casing and extending in a direction substantially transverse to the plane of the baffle-plate from the inlet opening into proximity to the baffle-plate, means providing a passageway for steam from said tubular member around the baffle-plate to the distant side thereof, means providing a passageway for steam from the distant side of the baffle-plate to the space between the casing and said tubular member, said casing having an outlet opening therein between the baffle-plate and the inlet, and means for draining oil from the casing, substantially as set forth.

3. A separator comprising a casing having an inlet opening, a baffle-plate located therein distant from said opening, a tubular member of substantial length mounted within the casing and extending in a direction substantially transverse to the plane of the baffle-plate from the inlet opening into proximity to the baffle-plate, a support mounted within the casing and supporting the end of the tubular member near the baffle-plate, said casing having an outlet opening in the wall thereof between the inlet and the baffle-plate, and means providing a passageway for steam from the tubular member around and beyond the baffle-plate and back to said outlet opening, substantially as set forth.

4. A separator comprising a casing having an inlet and an outlet opening, a baffle-plate located therein distant from said inlet opening, a tubular member of substantial length mounted within the casing and extending in a direction substantially transverse to the plane of the baffle-plate from the inlet opening into proximity to the baffle-plate, a wall mounted within the casing substantially parallel to the baffle-plate and supporting the end of said tubular-member adjacent to the baffle-plate, means providing a passageway for steam from said tubular member around the baffle-plate, and a strip secured to said wall and extending beyond the baffle-plate, said strip forming a passageway for steam between it and the casing, substantially as set forth.

5. A separator comprising a casing having an inlet opening, a baffle-plate located therein distant from said opening, a tubular member of substantial length mounted within the casing and extending in a direction substantially transverse to the plane of the baffle-plate from the inlet opening into proximity to the baffle-plate, said casing having two outlet openings in the wall thereof, one on the side of the baffle-plate distant from the inlet opening and one between the baffle-plate and the inlet opening, means providing a passageway for steam from said tubular member to said first-named outlet opening, and means providing a passageway for the steam leading from said passageway at a point beyond the baffle-plate to said second-named outlet, substantially as set forth.

This specification signed and witnessed this 7th day of May, 1910.

JOSEPH W. GAMBLE.

Witnesses:
 ROBERT G. CLIFTON,
 W. ATWOOD MEHARG.

---

Copies of this patent may be obtained for five cents each, by addressing the "Commissioner of Patents, Washington, D. C."